United States Patent [19]
Mackey

[11] Patent Number: 6,163,879
[45] Date of Patent: Dec. 19, 2000

[54] INTERFACE AND METHOD FOR FACILITATING WRITING AND MODIFYING OF LINES OF PROGRAMMING CODE

[75] Inventor: Timothy I. Mackey, Carlsbad, Calif.

[73] Assignee: Iomega Corporation, Roy, Utah

[21] Appl. No.: 09/137,806

[22] Filed: Aug. 20, 1998

[51] Int. Cl.[7] .................................................. G06F 9/45
[52] U.S. Cl. .................... 717/1; 717/2; 345/335
[58] Field of Search ................... 717/1, 2, 3, 4, 717/5, 11; 345/335, 336; 704/2, 3, 4, 10

[56] References Cited

U.S. PATENT DOCUMENTS

| | | | |
|---|---|---|---|
| 4,989,145 | 1/1991 | Kyushima ................................. | 704/9 |
| 5,504,902 | 4/1996 | McGrath et al. ....................... | 395/707 |
| 5,737,608 | 4/1998 | Vanter ..................................... | 395/701 |
| 5,854,930 | 12/1998 | McLain, Jr. et al. ................... | 395/705 |

OTHER PUBLICATIONS

Lunney et al., "Syntax–directed Editing", Soft. Engg. Journal, Mar. 1988, pp. 37–46.
Wingate et al., "Simplifying the writing of specifications", IEEE, 1988, pp. 184–189.
Hegazi et al., "Visual Craft: A Visual Integrated Development environment", IEEE 1997, pp. 210–214.
Read et al., "Generating direct manipulation program editors", IEEE 1996.

*Primary Examiner*—Kakali Chaki
*Attorney, Agent, or Firm*—Woodcock Washburn Kurtz Mackiewicz & Norris LLP

[57] ABSTRACT

An interface and method are disclosed for facilitating writing and modifying of lines of programming code on a computer having a processor and a display. The lines of code form a script, and the interface runs on the processor and is displayed on the display. A script display section displays at least a portion of the script, and an operation code display section displays a plurality of operation codes. At least some of the operation codes have at least one adjustable element. A selection of one of the operation codes is made to place a line of code corresponding to the selected operation code in the displayed script at a pre-selected script location. A selection device selects one of the lines of code in the displayed script, and a line display section displays the selected line of code according to each adjustable element therein. Each such adjustable element is separately displayed and separately adjustable. The adjustment of at least one adjustable element is intelligently restricted in a dynamic manner.

36 Claims, 11 Drawing Sheets

INTERFACE AND METHOD FOR FACILITATING WRITING AND MODIFYING OF LINES OF PROGRAMMING CODE

FIELD OF THE INVENTION

The present invention relates to programming and programming code. More particularly, the present invention relates to the writing and modifying of lines of programming code on a computer by way of a facilitating interface.

BACKGROUND OF THE INVENTION

Computer programming (i.e., programming for a computer, a processor, a controller, etc.) is typically written in the form of a series of lines of commands, where the commands are drawn from a pre-defined set of operation codes. As but one simple example, to count from 1 to 100, the following more-or-less generic program 'COUNT' could be employed:

BEGIN COUNT
DEFINE X INTEGER
X=1
DO UNTIL X=100
  X=X+1
END DO
END COUNT Typically, a program is written in a pre-defined language as source code, and is then compiled into a binary code that a computer processor, a controller, or the like can directly process. Such compiling usually takes place before the program is run, but can also occur during such run time.

As part of the compiling process, the source code is typically reviewed for errors, including syntactical errors and the like. For example, a compiler may check that a cited variable is previously defined, that a looping structure includes a defined beginning and a corresponding defined end, that all required parameters for an operation code are present, etc. Accordingly, a programmer can be advised of and can correct such errors.

However, detecting such errors at compile time can be cumbersome, especially if the programming code is long and the process of addressing compile time errors requires several iterations of compiling, program code checking, and modifying. Moreover, many of the errors that are detected at compile time could instead be avoided during writing of the program if only an appropriate device were available to do error checking and/or prevention during such program time. Accordingly, a need exists for such a device.

In writing a program, significant training is usually necessary in order to understand each operation code, the requirements necessary to combine the operation codes into a working form, and the various and sundry peculiarities of such programming. For example, while a typical programmer and perhaps even a layperson can understand the above-specified 'COUNT' program, to convert such program to a particular programming language, a programmer must know: proper beginning and ending structures in the language; proper ways to declare variables in the language; available looping structures in the language; proper ways to implement the available looping structures, including available looping conditions; and proper ways to increment a variable in the language, among other things.

Moreover, the programmer must know such arcane matters as whether operation codes and/or variables are case-sensitive; whether a variable, the variable value, and/or variable type information can be passed into one program from a call from another program; and whether a variable of one type can accept a value of another type, among other things. Clearly, the time necessary to learn programming in any particular language, let alone several different languages, can be excessive. Moreover, the investment of time may not be worthwhile, especially for an individual who is only an occasional programmer, or who does not wish to create programming code, but instead merely wishes to modify a portion of such programming code. Accordingly, a need exists for a device that assists a layperson or even a programmer in creating or modifying lines of programming code without requiring such layperson or programmer to have extensive knowledge in a particular programming language.

SUMMARY OF THE INVENTION

The present invention satisfies the aforementioned needs by providing an interface and method for facilitating writing and modifying of lines of programming code on a computer having a processor and a display. The lines of code form a script, and the interface runs on the processor and is displayed on the display.

A script display section displays at least a portion of the script, and an operation code display section displays a plurality of operation codes. At least some of the operation codes have at least one adjustable element. A selection of one of the operation codes is made to place a line of code corresponding to the selected operation code in the displayed script at a pre-selected script location.

A selection device selects one of the lines of code in the displayed script, and a line display section displays the selected line of code according to each adjustable element therein. Each such adjustable element is separately displayed and separately adjustable. The adjustment of at least one adjustable element is intelligently restricted in a dynamic manner.

BRIEF DESCRIPTION OF THE DRAWINGS

The foregoing summary, as well as the following detailed description of preferred embodiments of the present invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF PREFERRED EMBODIMENTS

Figure 1:
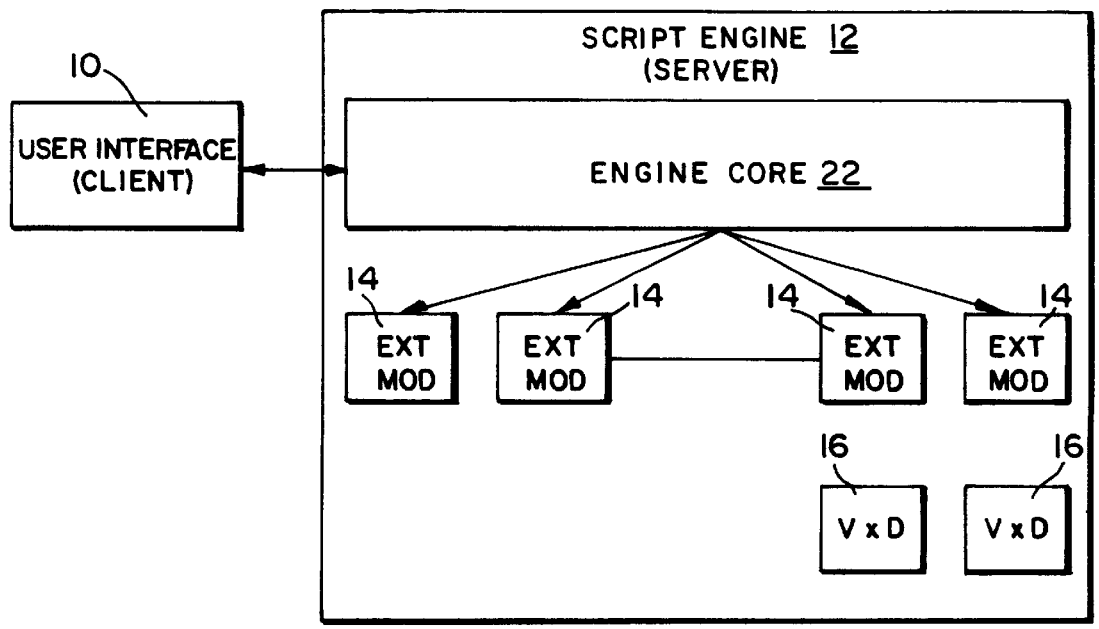
FIGS. 1 and 1A are block diagrams showing the architecture of an interface for facilitating writing and modifying of lines of programming code in accordance with a preferred embodiment of the present invention.

Certain terminology may be used in the following description for convenience only and is not considered to be limiting. For example, the words 'left', 'right', 'upper', and 'lower' designate directions in the drawings to which reference is made. The words 'inwardly' and 'outwardly' are further directions toward and away from, respectively, the geometric center of the referenced object. The terminology includes the words above specifically mentioned, derivatives thereof, and words of similar import.

Figure 1A:
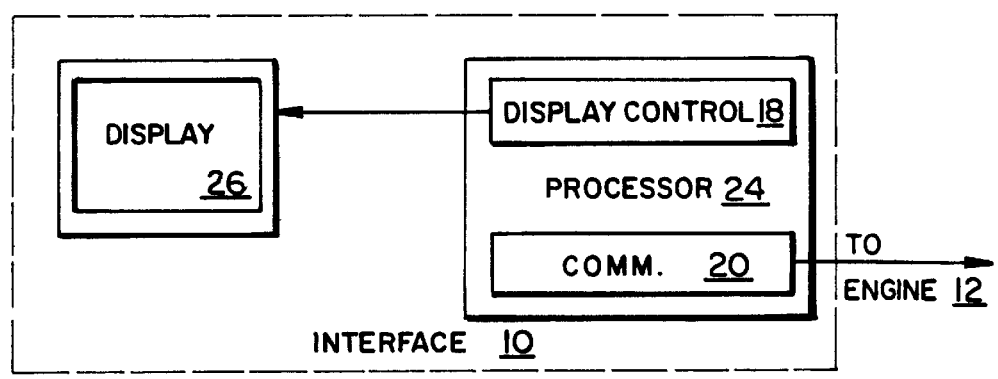

Referring now to FIGS. 1 and 1A, the architecture of an interface 10 for facilitating writing and modifying of lines of programming code, and a related script engine 12, are shown in accordance with a preferred embodiment of the present invention. The interface 10 and engine 12 form an architecture having a collection of application executables, dynamically linked libraries (DLLs) and virtual device drivers (VxDs 16, shown) that function collectively to provide scriptable device control in a client/server environment.

The user interface (client) 10 is an application that provides a user with access to the engine (server) 12. The interface 10 contains controls presented to a programmer (for example, as shown in FIGS. 2–10) by way of a display control 18, and a communications section (COMM 20) that communicates with the engine 12. Preferably, the display control 18 and communications section 20 of the interface 10 run on a computer processor 24 or the like, and the interface 10 is displayed on a computer display 26 or the like by way of the display control 18. However, other arrangements for the interface 10 may be employed without departing from the spirit and scope of the present invention.

As seen in FIG. 1, the engine 12 can include one or more language extension modules (LEMs) 14 implemented as DLLs, perhaps one or more VxDs 16, and a core 22. The LEMs 14 are functional sub-components and may additionally be a gateway to one or more VxDs 16. Preferably, the core 22 interfaces with as many LEMs 14 as may be specified. All scripted functionality is implemented in the LEMs 14. Preferably, the core 22 includes an interface through which engine control and status requests are made, a DLL and VxD loader, a file management device, and a real-time script interpreter (all not shown).

The interface 10 and the engine 12 may operate on the same computer, or alternatively may operate on different computers that are local to or remote from each other. If on the same computer, the interface 10 may operate in a different process-space than the engine 12. Any arrangement for implementing the interface 10 and engine 12 may therefore be employed without departing from the spirit and scope of the present invention.

The LEMs 14 implement a programming or scripting language. Such language may be any known or new language without departing from the spirit and scope of the present invention. Preferably, the language includes basic commands/operation codes for performing arithmetic, assigning variables, performing input/output, etc., as well as any language extensions available. Additionally, the language preferably includes commands/operation codes for accessing system resources such as files and hardware ports.

The interface 10 may be employed by a wide variety of users, both programmers and non-programmers. For example, for a product that includes firmware (i.e., software for operating the product), the interface 10 may be employed to write such firmware. Additionally, or alternatively, the interface may be employed by engineers during design, development, debugging, and production of the product to write programs to communicate with the product during such design, development, debugging, and production. For example, a manufacturing engineer may employ the interface to write a routine employed during manufacturing of the product. Likewise, the interface 10 may be employed for writing any other program or routine for any purpose without departing from the spirit and scope of the present invention.

It should be noted that in the present disclosure, terms such as 'lines of programming code', 'programming', 'program', 'routine', 'instruction set', and the like are generally interchangeable, such that reference to one is generally equivalent to a reference to any other. Moreover, it should be understood that the present invention may be employed to write any kind of programming without departing from the spirit and scope of the present invention. For example, the interface 10 of the present invention may be employed to write a simple routine, multiple programs that are to be linked, a complex set of inter-related programs, etc.

Figure 2:
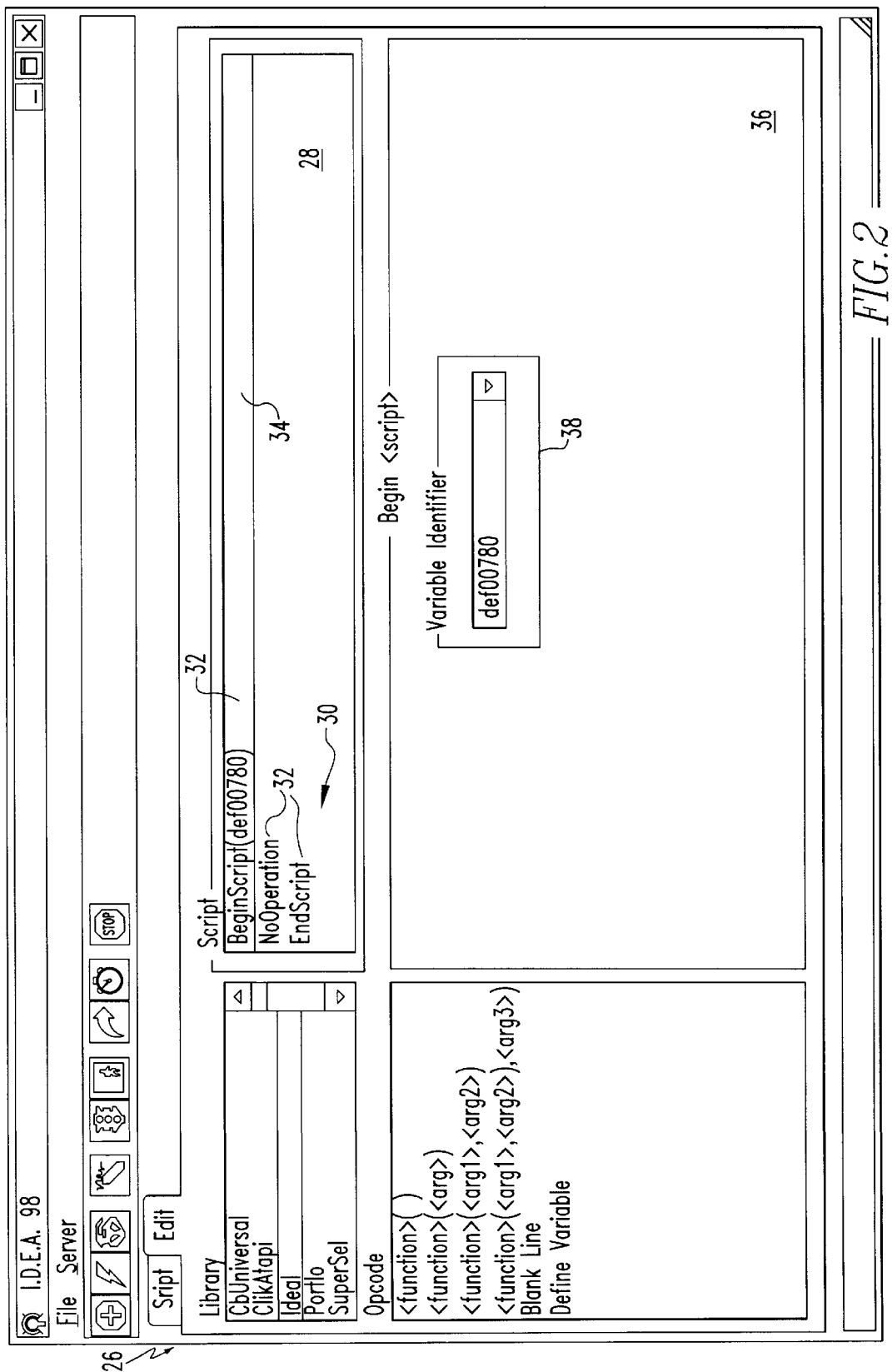
FIGS. 2–10 are diagrammatic views of the interface of FIG. 1 as displayed on a display, and show various steps performed in constricting lines of programming code in a preferred embodiment of the present invention.

Referring now to FIGS. 2–10, the display 26 of the interface 10 is shown in accordance with a preferred embodiment of the present invention, wherein the interface 10 is facilitating writing and modifying of lines of programming code. Referring first to FIG. 2, it is seen that the interface display 26 includes a script display section 28 that displays at least a portion of a script 30 having lines of programming code 32. As seen in FIG. 2, when a script is begun, a default set of lines of code 32 may be initially displayed. Here, there are three lines of code 32: 'BeginScript(def00780)', which defines the beginning of the script and includes an argument that has been automatically set to an initial setting, 'def00780'; 'NoOperation', which is a dummy or fill line; and 'EndScript', which defines the end of the script. Any variation of a default initial script or no initial default script may be employed without departing from the spirit and scope of the present invention. As but one example, an alternative to the default initial script shown in FIG. 2 may leave out the 'NoOperation' line of code 32.

The interface 10 and interface display 26 include a selection device 34 for selecting one of the lines of code 32 in the displayed script 28. As seen in FIG. 2, the selection device 34 is a scrollable highlight bar which is currently highlighting the 'BeginScript' line of code 32. However, any appropriate selection device 34 may be employed without departing from the spirit and scope of the present invention.

As also seen in FIG. 2, the interface display 26 includes a line display section 36 that displays the line of code 32 selected by the selection device 34 according to each adjustable element 44 therein. As should be understood, the term 'adjustable element' refers to any portion of a line of code 32 that is intended to be adjustable within such line of code 32, and can include but is not limited to variables, relations between variables, numerical values, arguments, mathematical functions, conditions, constants, and the like. For example, and still referring to FIG. 2, in the 'BeginScript' line of code 32 selected by the selection device 34, 'def00780' is an adjustable element 44 which is a variable identifier. Preferably, the line display section 36 displays each adjustable element 44 in a respective adjustment box 38 so that a user may access and modify such adjustable element 44 from its initial setting, or from a previous adjustment. Accordingly, and as seen in FIG. 3, the adjustable element 'def00780' can be adjusted from such initial setting to 'entry'.

Figure 3:
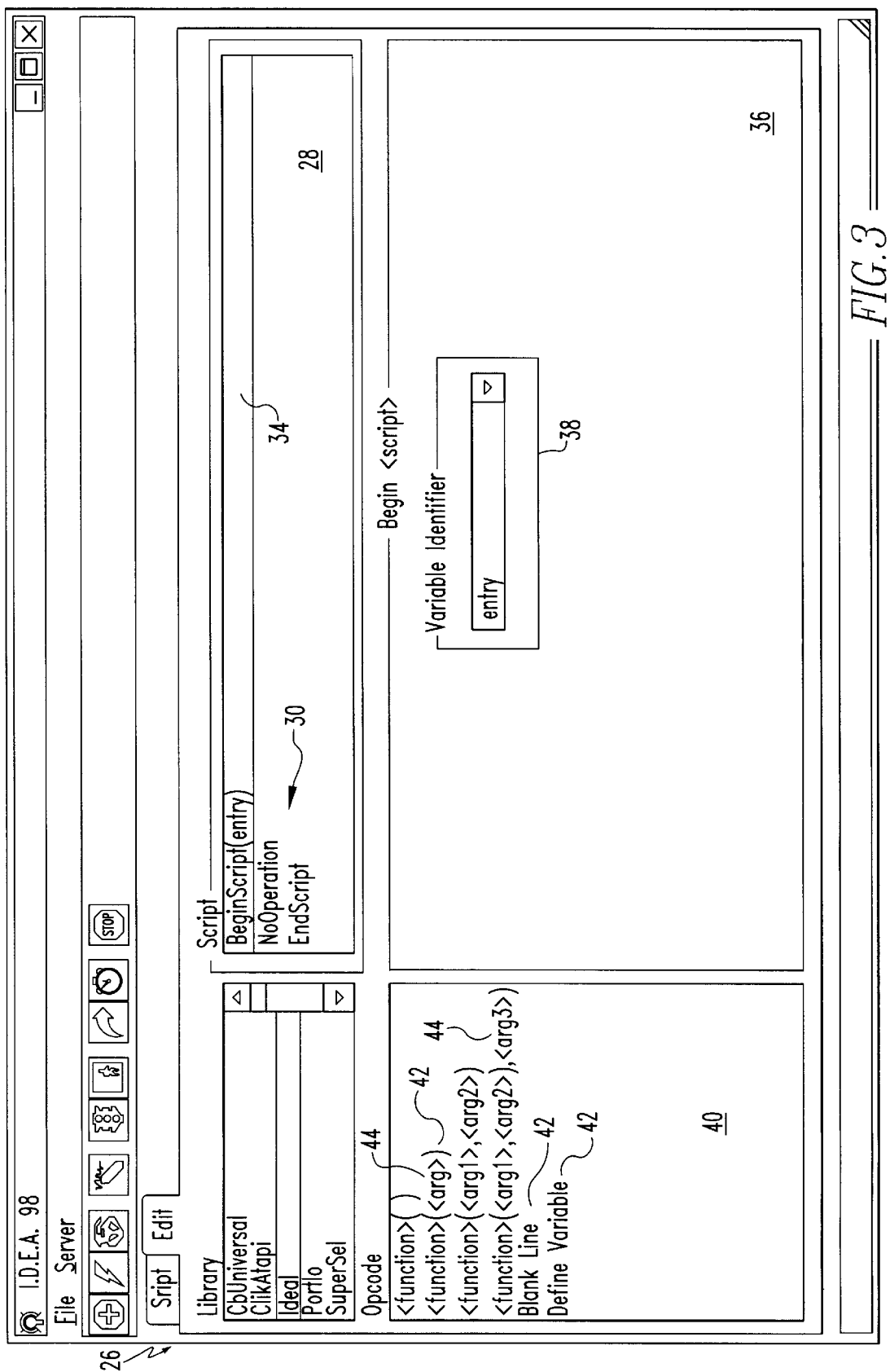

Still referring to FIG. 3, it is seen that the interface display 26 includes an operation code display section 40 displaying a plurality of operation codes 42. As seen, at least some of the operation codes 42 have at least one adjustable element 44 (for example 'arg', 'arg1', 'arg2', etc.). Each operation code 42 is available to be selected by a user. Accordingly, when one of the operation codes 42 is selected, a line of code 32 corresponding to the selected operation code 42 is placed in the script 30 as shown in the script display section 28 at a pre-selected script location. As should be understood, the selection of one of the operation codes 42 may take place by way of any of several implements, including a pointer or keyboard keys, as well as any other available mechanism. Preferably, the pre-selected script location is defined by the selection device 34. For example, the interface 10 may be set up to define the pre-selected script location as immediately before or immediately after a selected line of code 32 in the script display section 28, or alternatively may be set up to replace the line of code 32 in the script display section 28 selected by the selection device 34.

Figure 4:
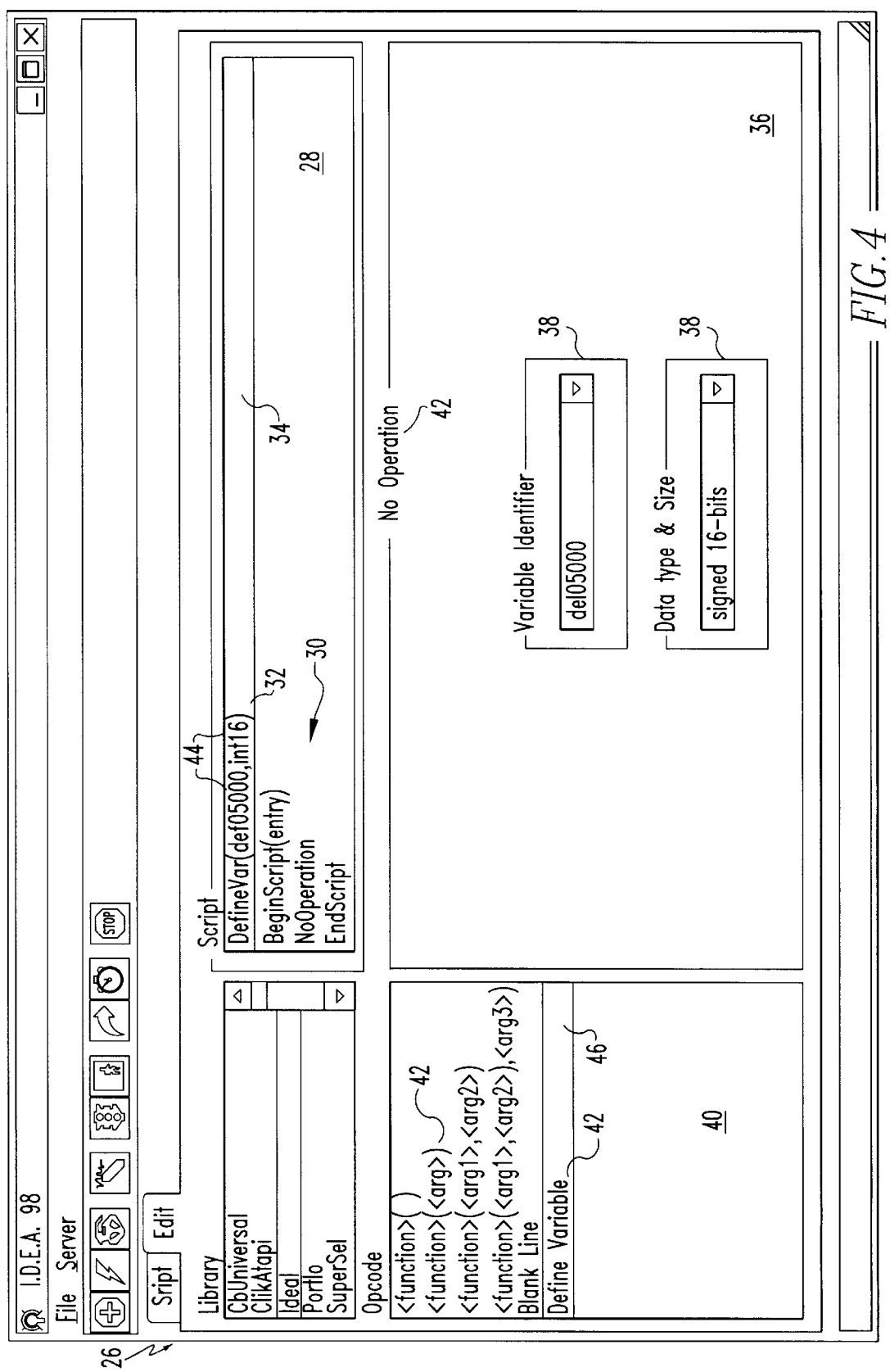

Referring now to FIGS. 3 and 4, it is seen that the interface 10 has been set up to define the pre-selected script location as being immediately before the line of code 32 selected by the selection device 34. Accordingly, when the operation code 'Define Variable' is selected (FIG. 3), the 'DefineVar(def05000,int16)' line of code 32 is placed in the script 30 displayed in the script display section 28 (FIG. 4). Note that, as seen in FIG. 4, the selection of the 'Define Variable' operation code 42 in the operation code display section 40 is indicated by highlighting 46 of such operation code 42. Note, too, that the line of code 32 created by the selection of the 'Define Variable' operation code 42 includes two adjustable elements 44: a variable name initially set to 'def05000', and a data type and size identifier initially set to 'int16' (16-bit integer). Preferably, when a line of code 32 is placed in the script display section 28, each adjustable element 44 in the placed line of code 32 is automatically set to an initial setting. Preferably, such initial setting is determined in an intelligent manner. For example, for a newly defined variable, the initial setting should be a generic name (such as 'def05000', 'def00325', etc.). Correspondingly, for an already defined variable, the initial setting should be one of the previously defined variables.

Preferably, when a line of code 32 is placed, the selection device 34 automatically selects such newly placed line of code 32. Based on such selection, then, and as seen in FIG. 4, the line display section 36 displays the newly placed line of code 32 according to each adjustable element 44 therein. Preferably, each adjustable element is separately displayed in a separate adjustable box 38, and is therefore separately adjustable. Accordingly, the variable identifier 'def5000' for the 'Define Var' line of code 32 is adjustable in one adjustment box 38 (the upper box 38 in FIG. 4), and the dated type and size 'int16' is separately adjustable and separately displayed in another adjustment box 38 (the lower box 38 in FIG. 4). Each such adjustable element 44 is therefore available for adjustment from its respective initial setting. As shown at the top thereof, the line display section 36 may for ease of reference include the name of the operation code 42 on which the line of code 32 selected by the selection device 34 is based.

Preferably, the selection device 34 may, be moved to any line of code 32 within a script 30 in the display section 28 by way of a pointer, keyboard key, or other appropriate device. Accordingly, the line of code 32 selected by the selection device 34 is displayed in the line display section 36 according to each adjustable element 44 therein and each adjustable element 44 is thereby separately displayed and separately available for adjustment. Preferably, the script 30 in the display section 28 is modifiable only by way of the line display section 36, and is not directly modifiable within the script display section 28. Accordingly, the interface 10 can intelligently restrict the adjustment of each adjustable element by way of restricting what is presented to the user in each adjustment box 38 in the line display section 36.

Preferably, and as seen by comparing FIGS. 3 and 4, the operation codes 42 displayed in the operation code display section 40 are intelligently restricted based on the pre-selected script location where a line of code 32 is to be placed within the script 30 (preferably selected by the selection device 34, as was explained above). As a result, a user can select from among only those operation codes 42 that are displayed. For example, and as seen in FIG. 4, because the selection device 34 is selecting a line of code 32 which is before the 'BeginScript' line of code 32, only a few operation codes 42 are available from the operation code display section 44 for insertion before such selected line of code 32. In particular, the operation codes 42 available include '<function>' operation codes, 'Blank Line', and 'Define Variable'. As should be understood, no other operation codes 42 should legitimately be placed before the 'BeginScript' line of code 32. Such intelligent restriction of operation codes 42 may be performed in any of a variety of manners without departing from the spirit and scope of the present invention.

Figure 5:
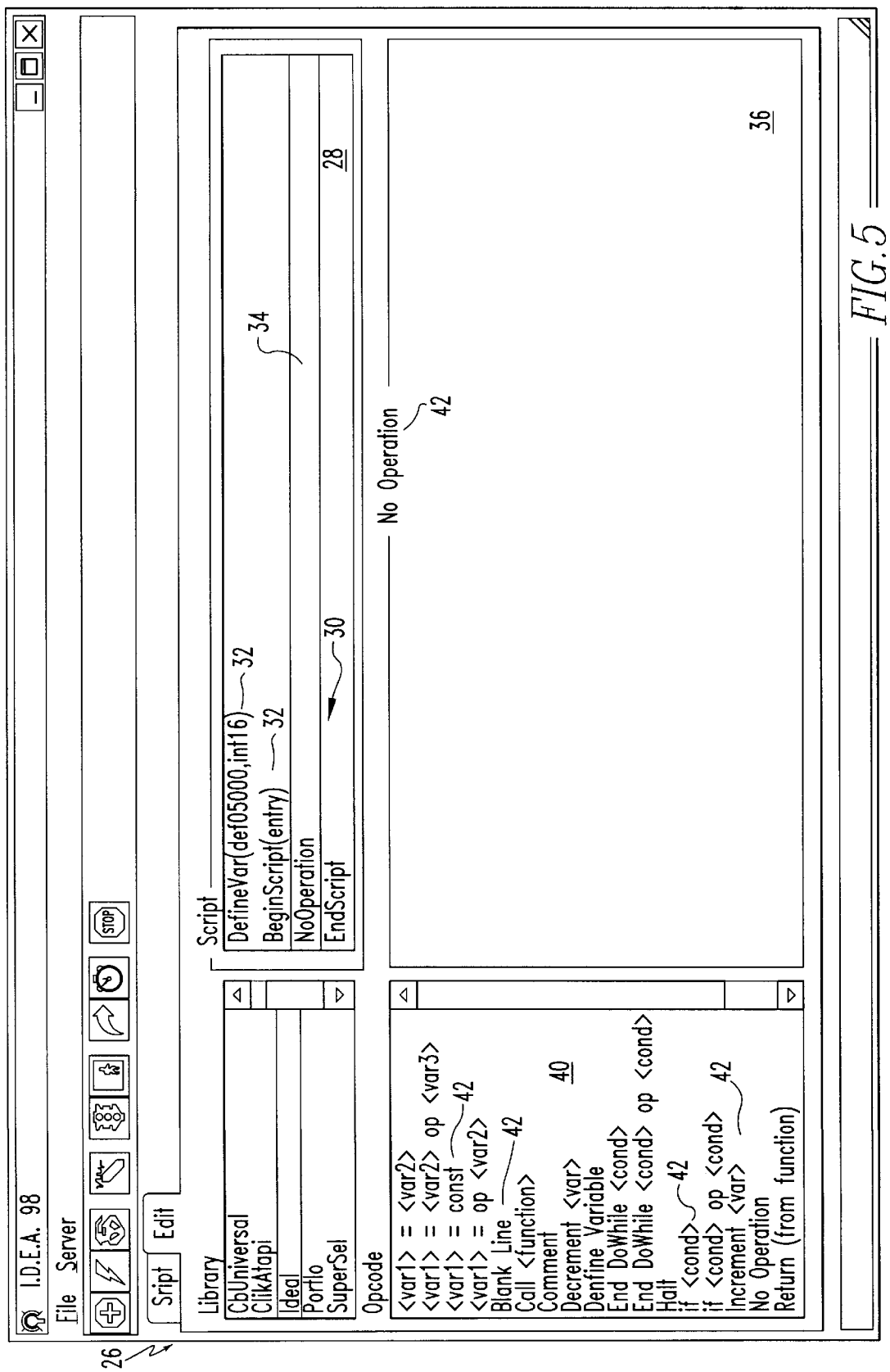

Comparing FIG. 4 with FIG. 5, it is seen that the selection device 34 has been moved down to the 'NoOperation' line of code 32 within the main body of the script 30 in the display section 28. Accordingly, the list of operation codes 42 displayed in the operation code display section 40 has changed to a list of operation codes 42 that can be inserted before such 'NoOperation' line of code 32. Here, it is seen that such operation codes 42 displayed include assignment operation codes, call operation codes, increment and decrement operation codes, looping operation codes, conditional operation codes, and the like.

It is also noted that since the list of operation codes 42 in the operation code display section 40 exceeds the space available in the operation code display section 40, an appropriate scroll bar has been automatically provided to allow a user to scroll through such list of operation codes 42. It is further noted that since the selection device 34 has selected the 'NoOperation' line of code 32 in the script 30 in the display section 28, and since such line of code 32 has no adjustable elements 44, the line display section 36 does not shown any adjustment boxes 38 for such line of code 32.

Figure 6:
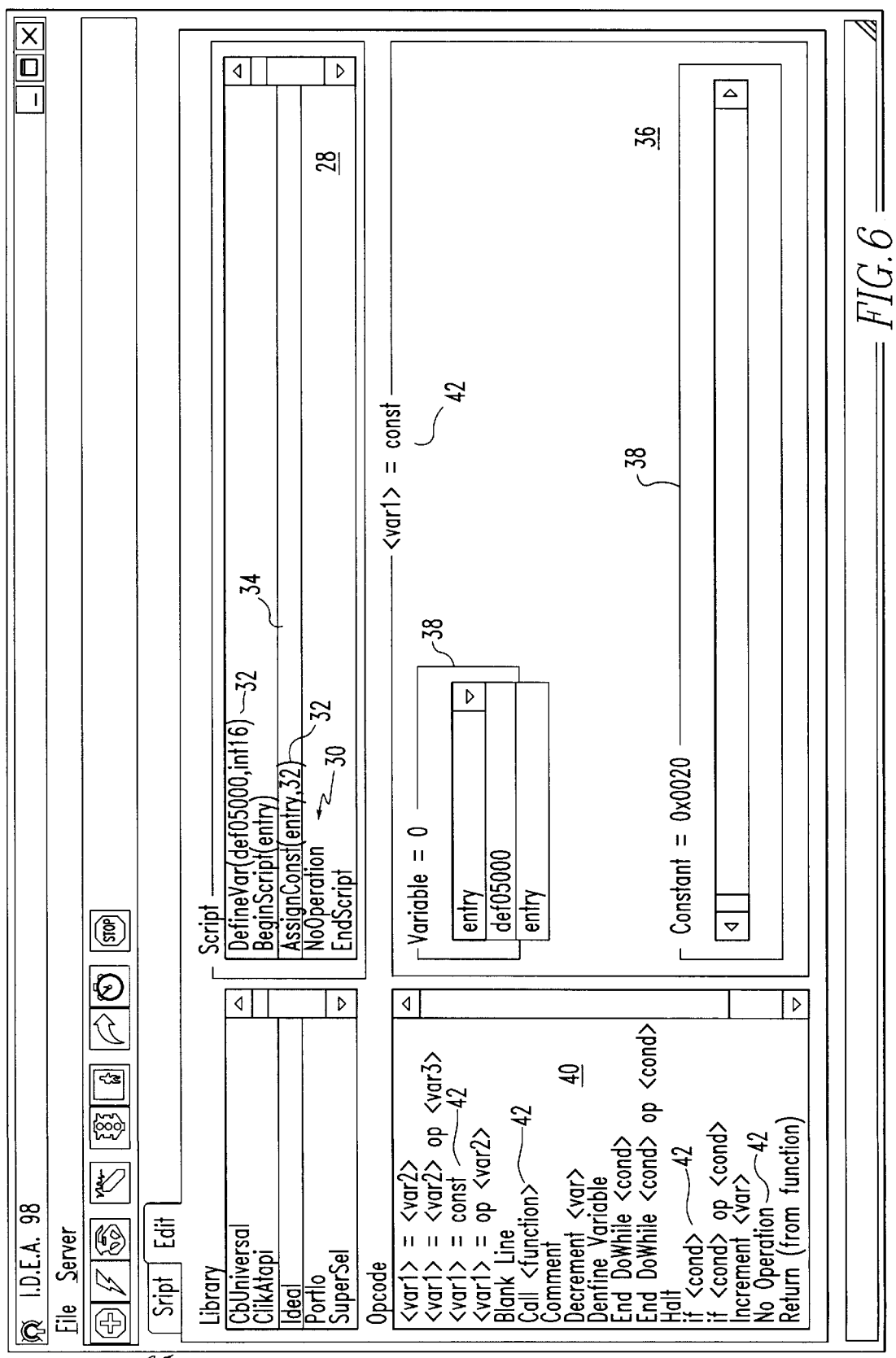

Referring now to FIGS. 5 and 6, it is seen that the '<var1>=const' operation code 42 has been selected from the list of operation codes 42 displayed in the operation display section 40 in FIG. 5. As a result, the 'AssignConst(entry,32)' line of code 32 has been placed in the script 30 in the script display section 28, as shown in FIG. 6. As seen, such line of code 32 includes a variable which has automatically been initially set to 'entry' ('entry' is the variable associated with the 'BeginScript' line of code 32), and a constant value which has automatically been initially set to 32. As also seen, the selection device 34 has automatically selected such newly placed line of code 32 such that each adjustable element 44 of such line of code 32 is separately displayed and separately adjustable in the line display section 36.

Preferably, an adjustable element 44 as displayed in an adjustment box 38 is intelligently restricted to a displayable list of choices, where applicable. For example, and as seen in FIG. 6, the 'variable' adjustable element 44 of the 'AssignConst' line of code 32 is intelligently restricted to 'def05000', which is defined in the 'DefineVar' line of code 32, and to 'entry', which is associated with the 'BeginScript' line of code 32. Preferably, the list of choices is composed in a dynamic manner. That is to say, the list of choices changes based on present conditions. For example, if an additional 'DefineVar' line of code 32 were to be added to define an additional variable (not shown), such additional variable would be dynamically added to the list of choices that the aforementioned 'variable' adjustable element 44 could be adjusted to.

Preferably, an adjustable element 44 as displayed in an adjustment box 38 is intelligently restricted to a displayable range and/or type of choices, where applicable. For example, and as also seen in FIG. 6, the 'constant' adjustable element 44 of the same 'AssignConst' line of code 32 is adjustable by way of an adjustment box 38 having a horizontal scroll bar. Accordingly, a user may increase such constant by scrolling to the right, and decrease to the left. Importantly, the user is restricted to values that are of the type of the variable to which the constant to be assigned. For example, if the 'variable' adjustable element 44 in such line of code 32 is an integer variable, such constant can be 23 or 24, but not 23.5. Here, since 'entry' is a 16-bit integer, such constant is also restricted to the range of 0 to 0×FFFF (in Hex notation). As should be understood, such intelligent restrictions prevent many syntactical errors that would otherwise not be detected and debugged until compile time.

Figure 7:
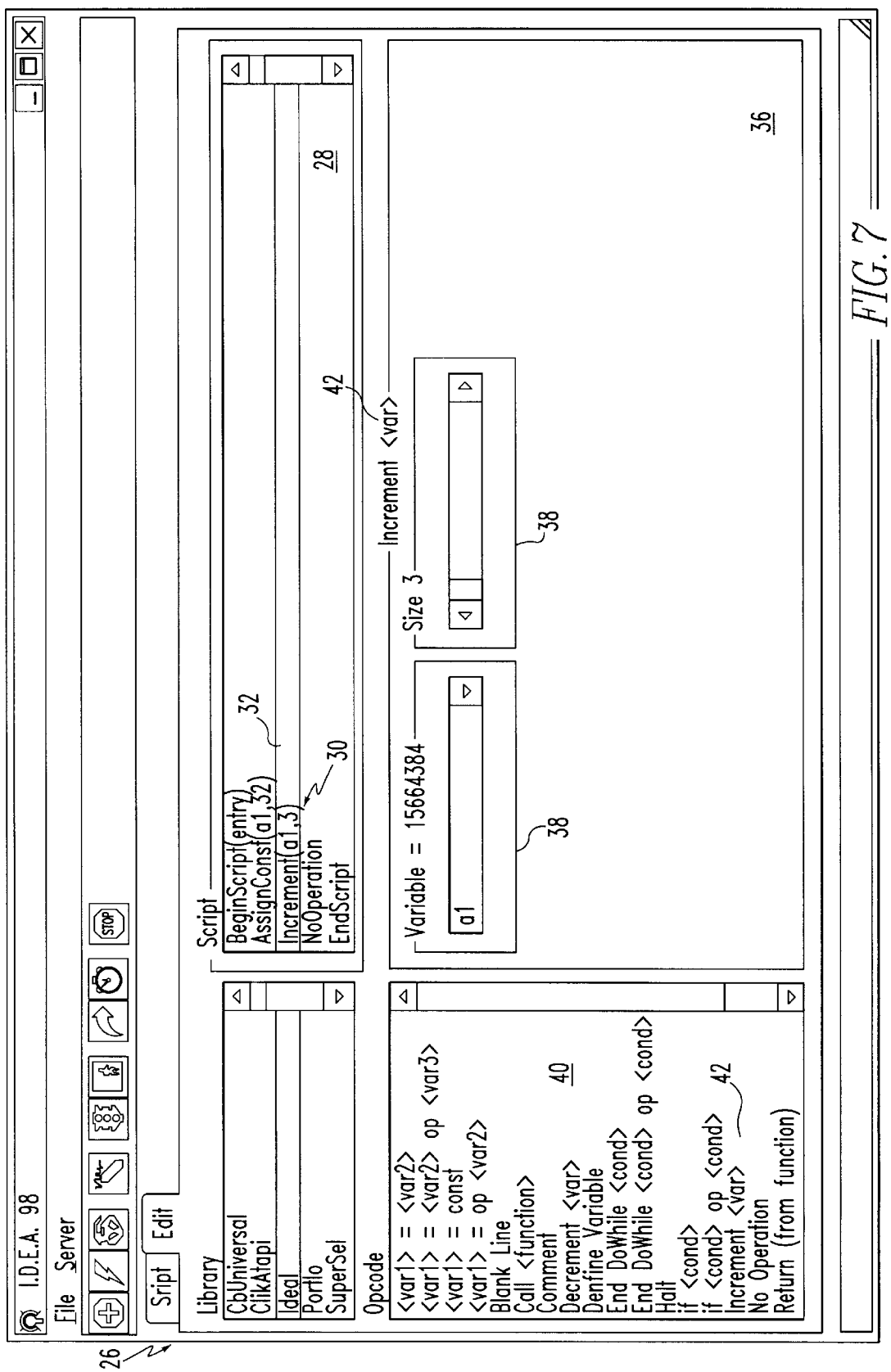

Referring now to FIG. 7, it is seen that the 'Increment' operation code 42 has been selected from the operation code display section 40, thereby placing the 'Increment' line of code 32 in the script 30 in the script display section 28. As also seen, the selection device 34 has automatically selected such newly place line of code 32, and such line of code 32 is therefore displayed in the line display section 36 according to each adjustable element therein. It is further seen that a variable 'a1' has been previously defined (not shown in the drawings), and that the 'AssignConst' line of code 32 of FIG. 6 has been previously modified so that 'entry' is now 'a1' (also not shown in the drawings).

Accordingly, and as seen in FIG. 7, the 'Increment' line of code 32 includes a 'variable' adjustable element 44 that has been set to 'a1', and an 'increment size' adjustable element 44 that has been set to 3.

Figure 8:
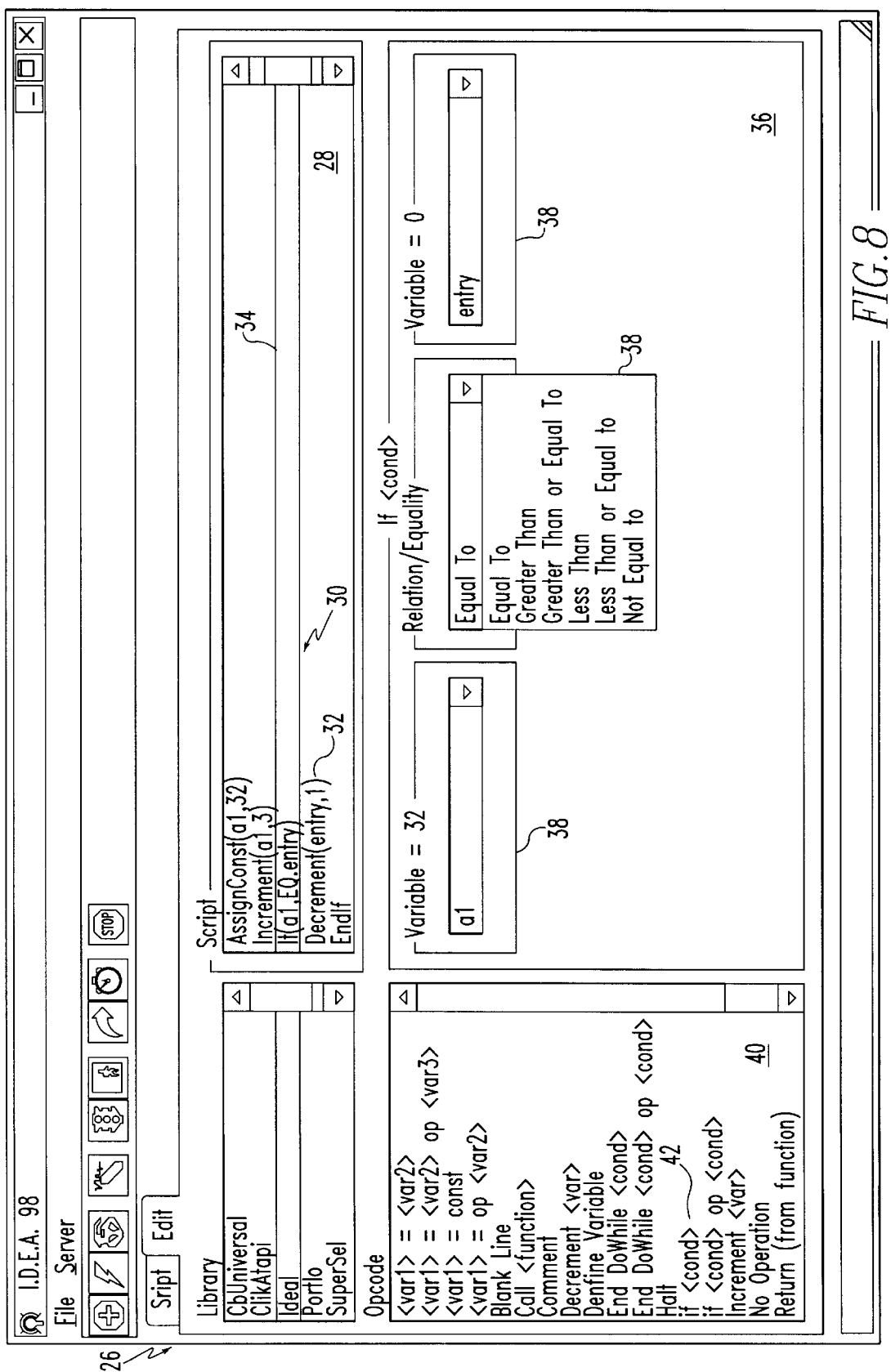

Referring now to FIG. 8, it is seen that the script 30 in the script display section 28 has been modified from its state as shown in FIG. 7 by the addition of 'If1', 'Decrement', and 'EndIf' lines of code 32 that together form a conditional structure. Preferably, when an operation code 42 that implements a conditional structure (IF-THEN, for example), a looping structure (DO-UNTIL, for example), or the like is selected from the operation code display section 40, such selection places an appropriate corresponding line of code 32 in the script 28 to begin such structure, and also places an appropriate additional line of code 32 in the script to end the structure. Accordingly, and as seen in FIG. 8, the selection of the 'If<cond>' operation code 42 places both the 'If1' and the 'EndIf' lines of code 32 together. Preferably, when placing a pair of lines of code 32 together in the manner of that shown in FIG. 8, the selection device 34 automatically selects the beginning line or the ending line depending on which line includes adjustable elements 44.

Still referring to FIG. 8, with the selection device 34 selecting the 'If1 ' line of code 32 for display in the line display section 36, three adjustment boxes 38 appear. As seen, the 'If1' line of code 32 requires a comparison of first and second 'variable' adjustable elements 44, based upon a 'relation/equality' adjustable element 44. As before, it is preferable that each 'variable' adjustable element 44 be intelligently restricted in a dynamic manner to variables already defined or otherwise known in the displayed script 28. As also seen, the 'relation/equality' adjustment element 44 is preferably intelligently restricted to a set of six pre-defined relationships.

As should be understood, in comparing first and second variables, it may be desirable to intelligently restrict the selection of variables according to type. That is to say, if for example a first selected variable is a 16-bit integer, it may be desirable to limit the second variable also to one that is a 16-bit integer. Of course, under certain circumstances, it may also be permissible to compare a variable have a 16-bit integer type with a variable having a 32-bit integer type, or even to compare variables having seemingly dissimilar types (for example, a text type and a boolean type). In any event, depending upon the type comparisons that are permissible, the interface 10 preferably intelligently restricts the selection of the variables in a dynamic manner so that the second variable is intelligently restricted to one having a type comparable to the type of the first variable.

Figure 9:
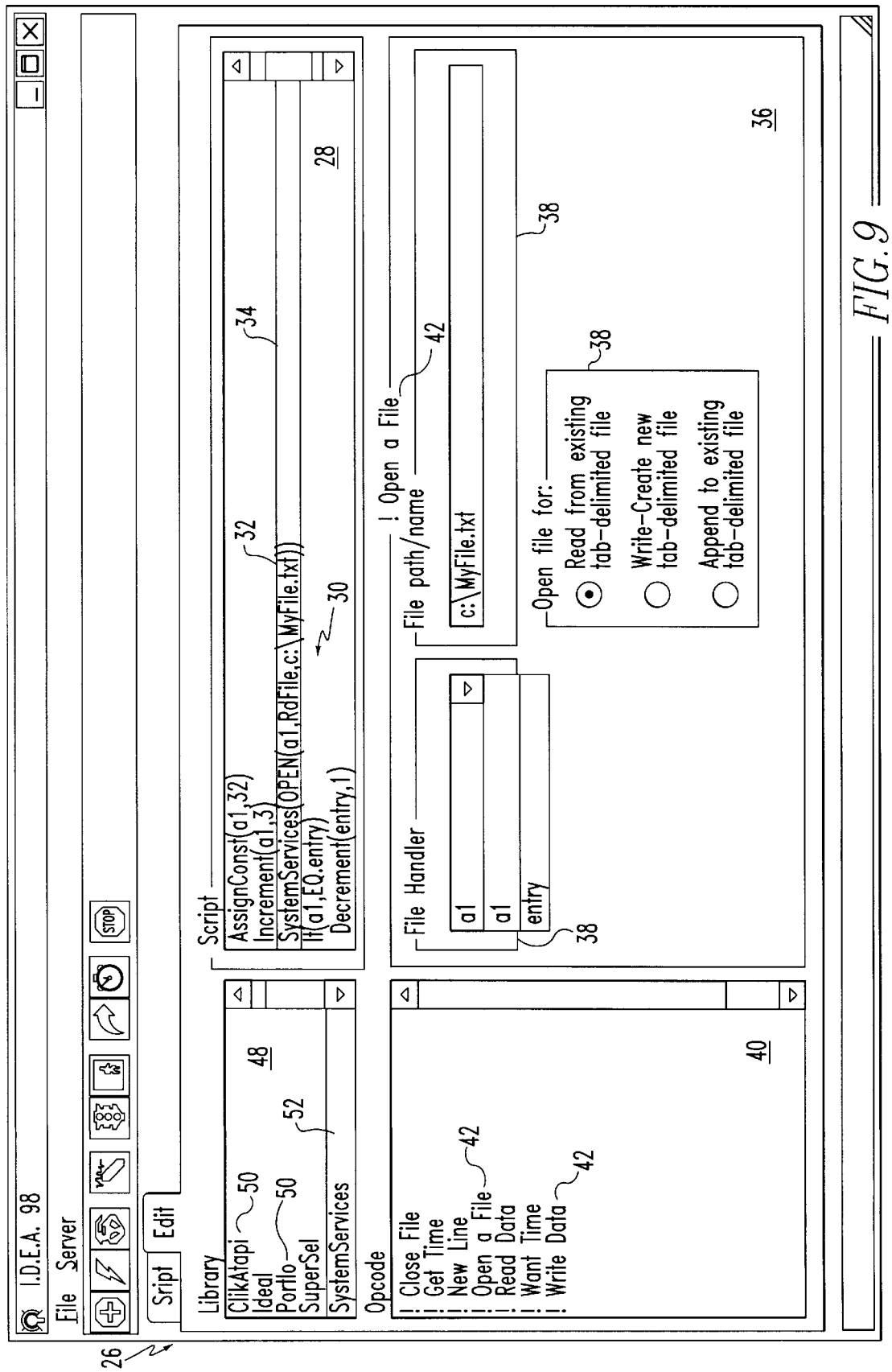

Referring now to FIG. 9, it is seen that the interface 10 preferably includes a library display section 48 displaying a plurality of operation code libraries 50. As should be understood, each operation code library 50 has a plurality of operation codes 42, and a selection of one of the libraries 50 by way of an appropriate library selection device 52 (for example, a pointer, keyboard key and/or a highlight bar) results in the display of at least a portion of the operation codes 42 from such selected library 50 in the operation code display section 42. As seen, by selecting the 'SystemServices' library, seven operation codes 42 for obtaining system services are displayed in the operation code display section 40.

The libraries 50 in the library display section 48 may be any appropriate libraries without departing from the spirit and scope of the present invention. For example, one library 50 may be a basic library from which basic operation codes 42 are available (such as the 'Ideal' library 50 from which the operation codes 42 were selected in FIGS. 2–8). Another library 50 may be specifically directed toward system operations, such as the system services library of FIG. 9. A further library 50 may be directed toward operation codes 42 specific to a particular subject matter, such as the 'ClikAtapi' library referenced in FIG. 10 (which may be used to access a disk drive or the like). As should be understood, additional libraries are made available to the interface 10 by way of appropriately adding LEMs 14 to the engine 12 (FIG. 1).

In FIG. 9, it is seen that the 'Open a File' operation code 42 has been selected from the operation code display section 40, that the selection device 34 has automatically selected the newly placed line of code 32 associated therewith, and that the line display section 36 is displaying adjustment boxes 38 for each adjustable element 44 of such line of code 32. The 'file handle' adjustable element 44 is intelligently restricted in a dynamic manner to the variables already defined: 'a1 ' and 'entry'. The 'open file for' adjustable element 44 is also intelligently restricted, but in a static manner, to three pre-defined choices. The 'file path/name' adjustable element 44, however, is not intelligently restricted, because the user must be allowed to specify any file (by path and name), whether in existence or to be created. Accordingly, the lack of such an intelligent restriction in this instance could result in a compile time or run time error. Thus, it should be understood that while such errors can be minimized by the interface 10 of the present invention, they are not necessarily eliminated in all instances. Parenthetically, it should be noted that a 'file path/name' adjustable element 44 in connection with a 'Write Data' operation code 42, for example, may be intelligently restricted in a dynamic manner to any file that has already been opened and not closed.

Figure 10:
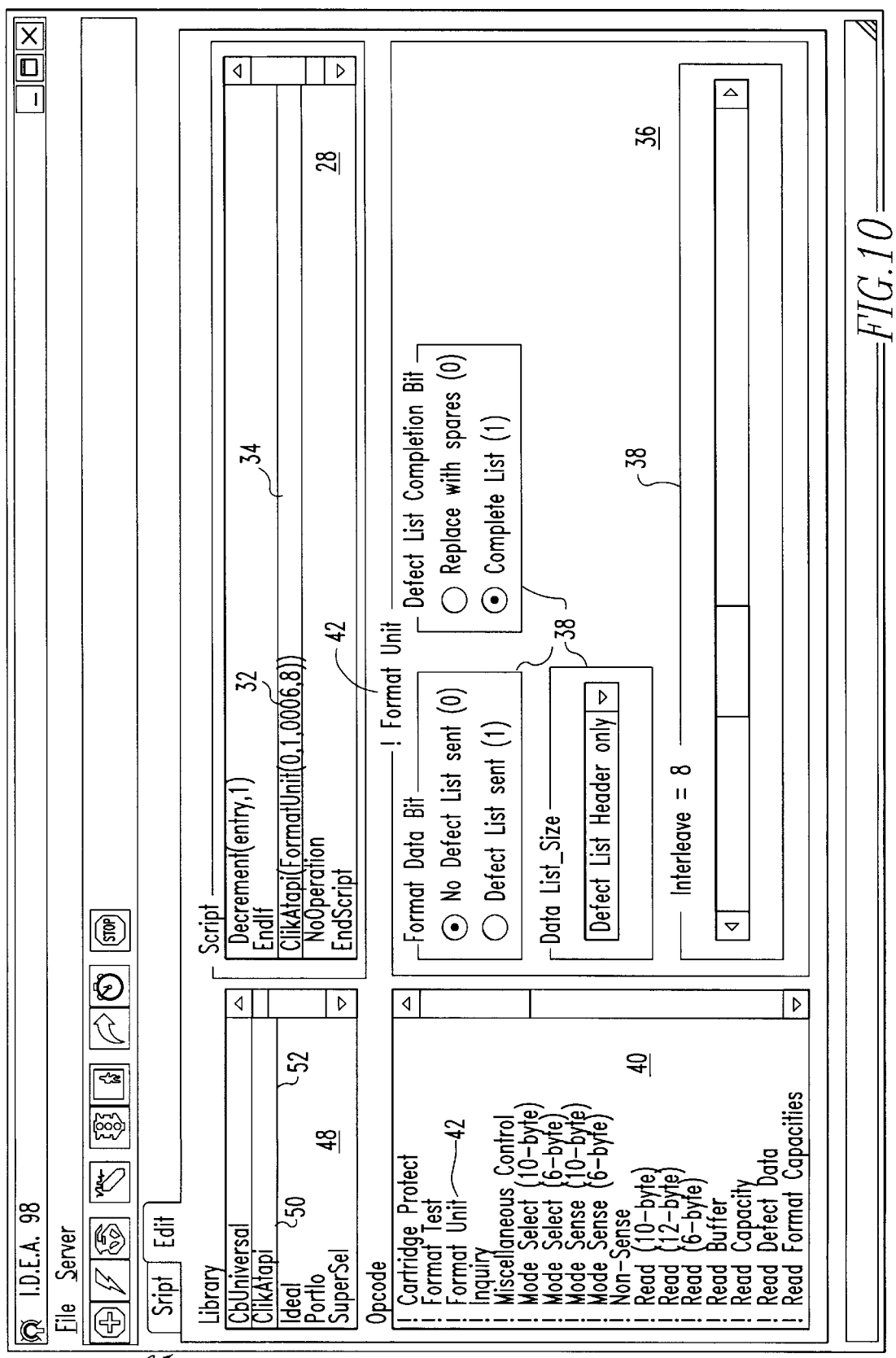

Referring now to FIG. 10, it is seen that the library selection device 52 has selected the 'ClikAtapi' library 50 in the library display section 48, that a 'ClikAtapi' 'Format Unit' operation code 42 has been selected in the operation code display section 40, that such operation code selection has placed a corresponding line of code 32 in the displayed script 30, that such placement has caused the selection device 34 to automatically select the newly place line of code 32, and therefore that such line of code 32 is displayed in the line display section 36 according to each adjustable element 44 therein such that four adjustment boxes 38 are shown. As should be understood, each adjustment box 38 is based on a definition of the associated adjustable element 44, and therefore is specified in accordance with such definition. For example, since the 'format data bit' adjustable element 44 can only be set to 0 or 1, the corresponding adjustment box 38 contains only those choices, along with a short description of each choice.

Such short description is preferable where necessary, since the definition of each adjustable element 44 in an operation code 42, and the permissible options for each adjustable element 44, are likely beyond the ambit of an interface user who is not familiar with the operation codes 42. Accordingly, care must be taken to ensure that all such operation codes 42 be fully and robustly defined so that an interface user is properly aided and is not unduly restricted in selecting from among the permissible options of each adjustable element 44 of each operation code 42.

Figure 11:
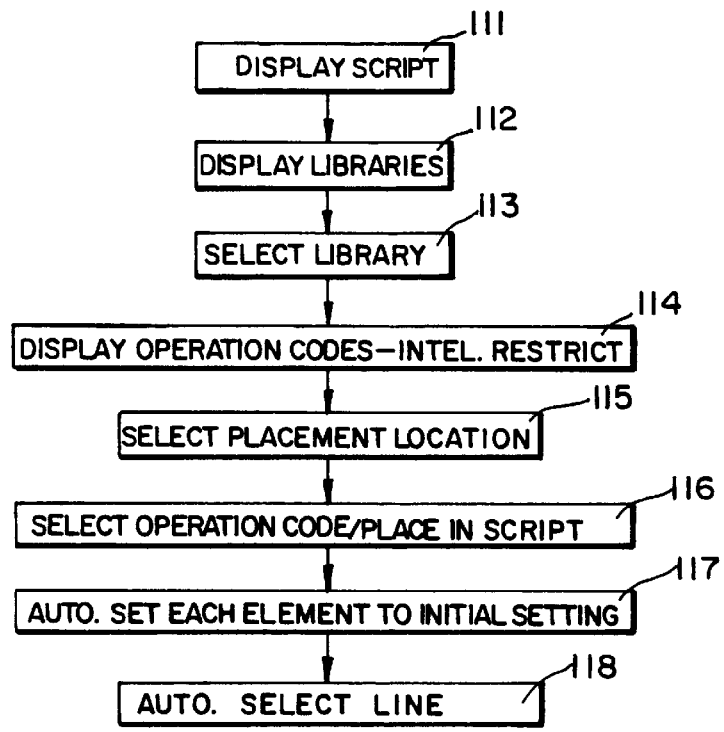
FIGS. 11 and 12 are flowcharts showing steps performed by the interface of FIG. 1 in a preferred embodiment of the present invention.
Figure 12:
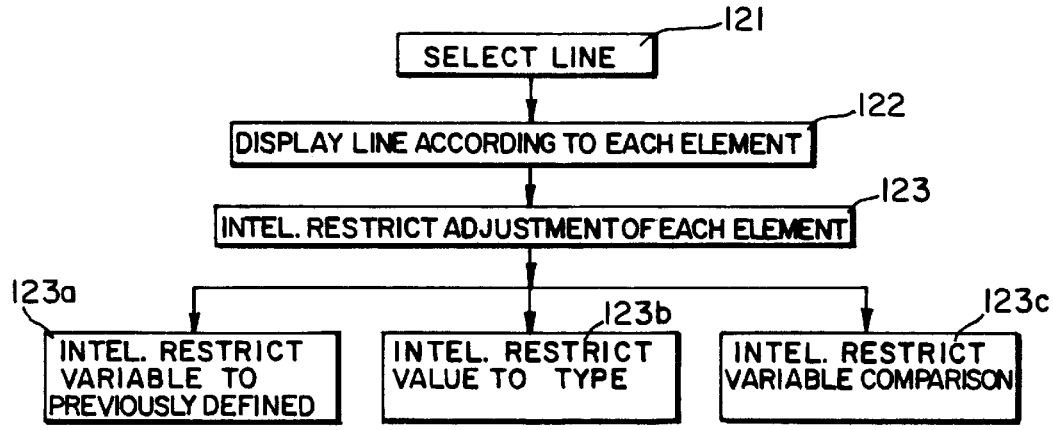

Referring now to FIGS. 11 and 12, it is seen that the use of the interface 10 as described above can be broken down into two main aspects: adding lines of code 32 (FIG. 11) and modifying lines of code (FIG. 12), either newly added or already present. In particular, and referring now to FIG. 11, to add a line of code 32, at least a portion of a script 30 is displayed in the script display section 28 (step 111), and one or more libraries 50 are displayed in the library display section 48 (step 112). A library 50 is then selected (step 113) to display at least a portion of available operation codes 42 from such library 50 in the operation code display section 40 (step 114). Preferably, the operation codes displayed are intelligently restricted based on the location selected for placement of such line of code 32 (step 115). An operation code 42 is then selected and place in the script 30 as a line of code 32 (step 116), each adjustable element 44 in the line of code 32 is automatically set to an initial setting (step 117), and the selection device 34 automatically selects such newly place line of code 32 (step 118).

By being automatically selected, the newly placed line of code 32 is available for modification by way of the line display section 36 and the adjustment boxes 38 displayed therein for such line of code 32. Of course, the selection device 34 may be manipulated to select any other line of code 32 that has already been placed (step 121). Whatever line is selected is displayed in the line display section 36 according to each adjustable element 44, by way of appropriate adjustment boxes 38. Preferably, the adjustment of each adjustable element 44 is intelligently restricted in the adjustment box 38 (step 123), if possible. For example, a variable is intelligently restricted to those variables previously defined (step 123a) (unless defining a new variable, of course), value (numeric, text, boolean, etc.) to be assigned to variables are restricted to appropriate types (step 123b), and variable comparisons are intelligently restricted according to type or otherwise (step 123c).

The source code necessary to implement the interface 10 will vary based on the programming language that will be produced, without departing from the spirit and scope of the present invention. However, one skilled in the art will recognize the steps necessary to implement the interface 10 of the present invention in source code. Accordingly, no examples of such source code are attached or are believed necessary for, full understanding of the present invention.

In the present invention, writing and modifying of source code is intelligently restricted such that many errors are avoided, thereby reducing the amount of time spent debugging such errors at compile time and/or run time. In addition, in the present invention, an interface 10 is provided to facilitate such writing and modifying, wherein significant training in a programming language is not necessary. The interface 10 includes many of the details of the language, such that an interface user need not be burdened with such details. Instead, the user need only have a rudimentary understanding of programming in general, and perhaps a more detailed understanding of some specialized commands that would be of particular use to the user. Accordingly, the interface is particularly useful to an individual who is only an occasional programmer or even a layperson, or to an individual who does not wish to create programming code, but instead merely wishes to modify a portion of programming code.

In the foregoing description, it can be seen that the present invention comprises a new and useful interface and method for facilitating writing and modifying of lines of programming code. It should be appreciated by those skilled in art that changes could be made to the embodiments described above without departing from the inventive concepts thereof. It is understood, therefore, that this invention is not limited to the particular embodiments disclosed, but it is intended to cover modifications within the spirit and scope of the present invention as defined by the appended claims.

What is claimed is:

1. A computer-readable medium having computer-executable instructions thereon for implementing on a computer having a processor and a display an interface for facilitating writing and modifying of lines of programming code on the computer, the lines of code forming a script, the interface running on the processor and being displayed on the display, the instructions comprising modules including:

a script display module displaying at least a portion of the script in a script display section on the display;

an operation code display module displaying a plurality of operation codes in an operation code display section on the display, at least some of the operation codes having at least one adjustable element, a selection of one of the operation codes being made to place a line of code corresponding to the selected operation code in the displayed script at a pre-selected script location;

a selection module for selecting one of the lines of code the displayed script; and a line display module displaying the selected line of code in a line display section on the display according to each adjustable element therein, each such adjustable element being separately displayed and separately adjustable.

2. The medium of claim 1 wherein the line display module allows the script to be modified only by way of the line display section.

3. The medium of claim 1 wherein the selection module also selects the script location where a line of code is to be placed.

4. The medium of claim 3 wherein the selected script location is selected from a group consisting of immediately before the selected line of code and immediately after the selected line of code.

5. The medium of claim 1 wherein the pre-selected script location where a line of code is to be placed intelligently restricts which operation codes the operation code display module displays in the operation code display section, such displayed operation codes thereby being available to be selected.

6. The medium of claim 1 wherein the line display module automatically sets each adjustable element in a line of code to an initial setting upon placement of such line of code.

7. The medium of claim 6 wherein the selection device automatically selects a line of code upon placement thereof, the line display module thereby displaying such placed line of code according to each adjustable element therein, each such adjustable element being available for adjustment from the respective initial setting.

8. The medium of claim 1 wherein the line display module intelligently restricts the adjustment of at least one adjustable element to a displayable list of choices, the list of choices being composed by the line display module in a dynamic manner.

9. The medium of claim 1 wherein if a line of code has a particular adjustable element that accepts a variable, the line display module intelligently restricts such variable adjustable element to be adjusted only to a variable previously defined in the script.

10. The medium of claim 1 wherein if a line of code has a variable with a pre-defined type and the variable is to be assigned a value, the line display module intelligently restricts the value to the type.

11. The medium of claim 1 wherein if a line of code has a first variable with a pre-defined type and the first variable is to be compared with a second variable, the line display module intelligently restricts the second variable to one having a type comparable to the type of the first variable.

12. The medium of claim 1 further comprising a library display module displaying a plurality of operation code libraries in a library display section on the display, each operation code library having a plurality of operation codes, and a library selection device for selecting one of the libraries, at least a portion of the operation codes of the selected library being displayed in the operation code display section.

13. A computer having a processor, a display, and an interface running on the processor and being displayed on the display, the interface for facilitating writing and modifying of lines of programming code, the lines of code forming a script, the interface comprising:

a script display section displaying at least a portion of the script;

an operation code display section displaying a plurality of operation codes, at least some of the operation codes having at least one adjustable element, a selection of one of the operation codes being made to place a line of code corresponding to the selected operation code in the displayed script at a pre-selected script location;

a selection device for selecting one of the lines of code in the displayed script; and a line display section displaying the selected line of code according to each adjustable element therein, each such adjustable element being separately displayed and separately adjustable.

14. The computer of claim 13 wherein the script is modifiable only by way of the line display section.

15. The computer of claim 13 wherein the selection device also selects the script location where a line of code is to be placed.

16. The computer of claim 15 wherein the selected script location is selected from a group consisting of immediately before the selected line of code and immediately after the selected line of code.

17. The computer of claim 13 wherein the pre-selected script location where a line of code is to be placed intelligently restricts which operation codes are displayed in the operation code display section, such displayed operation codes thereby being available to be selected.

18. The computer of claim 13 wherein each adjustable element in a line of code is automatically set to an initial setting upon placement of such line of code.

19. The computer of claim 18 wherein the selection device automatically selects a line of code upon placement thereof, the line display section thereby displaying such placed line of code according to each adjustable element therein, each such adjustable element being available for adjustment from the respective initial setting.

20. The computer of claim 13 wherein the adjustment of at least one adjustable element is intelligently restricted to a displayable list of choices, the list of choices being composed in a dynamic manner.

21. The computer of claim 13 wherein if a line of code has a particular adjustable element that accepts a variable, such a variable adjustable element is intelligently restricted to be adjusted only to a variable previously defined in the script.

22. The computer of claim 13 wherein if a line of code has a variable with a pre-defined type and the variable is to be assigned a value, the value is intelligently restricted to the type.

23. The computer of claim 13 wherein if a line of code has a first variable with a pre-defined type and the first variable is to be compared with a second variable, the second variable is intelligently restricted to one having a type comparable to the type of the first variable.

24. The computer of claim 13 further comprising a library display section displaying a plurality of operation code libraries, each operation code library having a plurality of operation codes, and a library selection device for selecting one of the libraries, at least a portion of the operation codes of the selected library being displayed in the operation code display section.

25. A method of facilitating writing and modifying of lines of programming code on a computer having a processor and a display, the lines of code forming a script, the method comprising the steps of:

displaying at least a portion of the script on a script display section of the display;

displaying a plurality of operation codes on an operation code display section of the display, at least some of the operation codes having at least one adjustable element;

selecting one of the operation codes to place a line of code corresponding to the selected operation code in the displayed script at a pre-selected script location;

selecting one of the lines of code in the displayed script; and displaying the selected line of code on a line display section according to each adjustable element therein, each such adjustable element being separately displayed and separately adjustable.

26. The method of claim 25 further comprising the step of modifying the script only by way of the line display section.

27. The method of claim 25 wherein the step of selecting one of the lines of code in the displayed script also selects the script location where a line of code is to be placed.

28. The method of claim 27 wherein the step of selecting one of the lines of code in the displayed script also selects the script location where a line of code is to be placed as being one of immediately before the selected line of code and immediately after the selected line of code.

29. The method of claim 25 further comprising the step of intelligently restricting which operation codes are displayed in the operation code display section according to the pre-selected script location where a line of code is to be placed, such displayed operation codes thereby being available to be selected.

30. The method of claim 25 further comprising the step of automatically setting each adjustable element in a line of code to an initial setting upon placement of such line of code.

31. The method of claim 30 further comprising the step of automatically selecting a line of code upon placement thereof, the line display section thereby displaying such placed line of code according to each adjustable element therein, each such adjustable element being available for adjustment from the respective initial setting.

32. The method of claim 25 further comprising the step of intelligently restricting the adjustment of at least one adjustable element to a displayable list of choices, the list of choices being composed in a dynamic manner.

33. The method of claim 25 wherein, with respect to a line of code having a particular adjustable element that accepts a variable, the method further comprises the step of intelligently restricting such variable adjustable element to be adjusted only to a variable previously defined in the script.

34. The method of claim 25 wherein, with respect to a line of code having a variable with a pre-defined type, the variable to be assigned a value, the method further comprising the step of intelligently restricting the value to the type.

35. The method of claim 25 wherein, with respect to a line of code having a first variable with a pre-defined type, the first variable to be compared with a second variable, the method further comprising the step of intelligently restricting the second variable to one having a type comparable to the type of the first variable.

36. The method of claim 25 further comprising the steps of:
- displaying a plurality of operation code libraries on a library display section, each operation code library having a plurality of operation codes;
- selecting one of the libraries; and
- displaying at least a portion of the operation codes of the selected library in the operation code display section.

* * * * *

UNITED STATES PATENT AND TRADEMARK OFFICE
CERTIFICATE OF CORRECTION

PATENT NO.    : 6,163,879
DATED         : December 19, 2000
INVENTOR(S)   : Mackey It is certified that error appears in the above-identified patent and that said Letters Patent is hereby corrected as shown below:

<u>Column 1,</u>
Line 27, after "END COUNT", the next word "Typically" should start a new paragraph.

<u>Column 7,</u>
Line 34, "Accordingly" should follow after the previous sentence.

Signed and Sealed this

Fourteenth Day of August, 2001

*Attest:*

*Nicholas P. Godici*

*Attesting Officer*

NICHOLAS P. GODICI
*Acting Director of the United States Patent and Trademark Office*